April 21, 1931.  A. ONOFRIO  1,802,268

COFFEE URN

Filed July 3, 1930  2 Sheets-Sheet 1

Inventor
Anastas Onofrio
By Mawhinney & Mawhinney
Attorneys

April 21, 1931.  A. ONOFRIO  1,802,268
COFFEE URN
Filed July 3, 1930  2 Sheets-Sheet 2

Inventor
Anastas Onofrio
By Mawhinney & Mawhinney
Attorneys

Patented Apr. 21, 1931

1,802,268

UNITED STATES PATENT OFFICE

ANASTAS ONOFRIO, OF DETROIT, MICHIGAN

COFFEE URN

Application filed July 3, 1930. Serial No. 465,666.

The present invention relates to improvements in coffee urns and has for an object to provide an improved coffee urn in which a single unit may take the place of a plurality of urns or containers now generally used, and such a single unit perform all the functions of coffee making, thus dispensing with the expense and the requirement for greater space as in the case of the three or more receptacles now generally needed.

Another object of the invention is to provide an improved coffee urn in which the coffee is made and prepared in a coffee-making compartment and thereafter transferred, without access to the atmosphere, to a coffee-storage compartment where the coffee will be maintained against evaporation and flavor losses and against contamination.

A further object of the invention resides in providing an improved coffee urn in which economy of gas, labor and material is had and in which a greater volume of coffee may be derived from a given amount of material.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
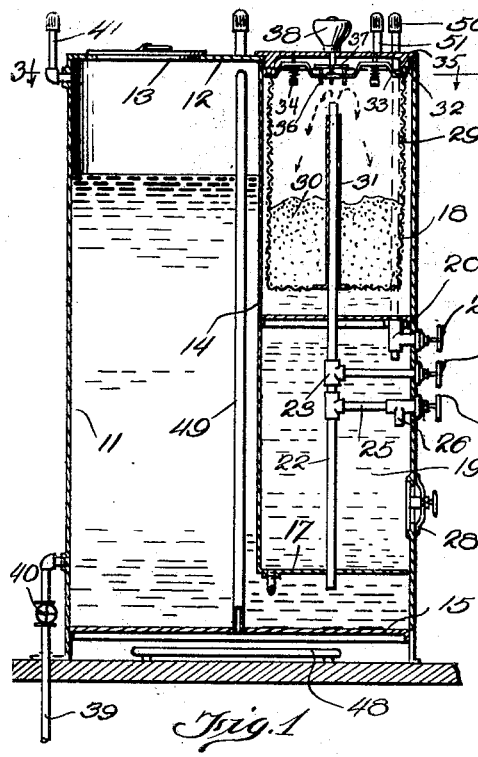
Figure 1 is a vertical section taken through an improved coffee urn constructed in accordance with the present invention.

Referring more particularly to the drawing and for the present to Figures 1 to 5 inclusive, 10 designates a container or urn which may be of any suitable material, shape and capacity and having therein a water space 11 which extends completely across the bottom of the urn and up along one side thereof to the top 12 of the urn which may be provided with a removable cover 13 which will give access to the interior of the water space for the purpose of cleaning.

Within the container is a vertical partition 14 extending down from the top 12 to within a short distance of the bottom 15. Transverse or horizontal partitions 16 and 17 extend from the vertical partition over to the adjacent side wall of the container 10 and thus divide the remaining portion of the container into a coffee-making compartment 18 and a coffee-storage compartment 19 disposed below the compartment 18 and adapted to communicate therewith through a connection or pipe 20 under the control of a valve 21, the operating handle of which is exposed on the exterior of the urn for easy opening and closing of the valve.

Up through both compartments 18 and 19 extends a tube or pipe 22 which opens at its lower end into the water space 11 and at its upper end into the upper portion of the coffee-making compartment 18. In this pipe or tube 22 is a valve 23 having an operating handle or wheel 24 on the exterior of the urn for the purpose of opening and closing the valve.

A wash pipe 25 is also connected with the tube or pipe 22 below the valve 23, this wash pipe being connected with a spigot or drain 26 under the control of a valve 27 also exposed on the exterior of the urn for governing the supply of wash water to the interior of the coffee-storage compartment 19. In the side of the urn is a removable door 28 for the purpose of giving access to the interior of the storage compartment 19 when it is desired to clean the same.

In the coffee-making compartment 18 is removably received a wire mesh receptacle 29 for containing the ground coffee indicated at 30. A pipe or tube 31 extends up from an opening in the bottom of the mesh receptacle 29 for the purpose of slidably fitting over the tube 22; the arrangement being such that the upper open end of the tube 22 will preferably extend above the sleeve or tube 31 of the coffee receptacle when such receptacle is fitted into final position shown in Figure 1.

Figure 5:
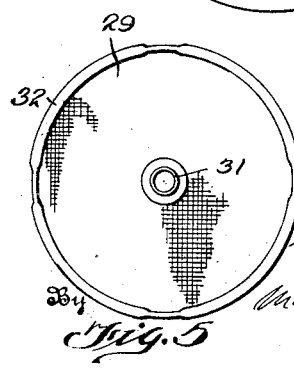
Figure 5 is a top plan view of the coffee receptacle with the cover removed.

The coffee receptacle 29, as more particularly shown in Figures 1 and 5, is provided at its upper edge with a ring 32 adapted to cooperate with pivoted catches 33 pivotally mounted, as at 34, beneath the removable cover 35 for the receptacle. This cover 35 is preferably imperforate and made from any appropriate material of a diameter to extend beyond the side wall of the coffee receptacle 29 and rest upon the roof or top 12 of the urn.

The urn will of course be provided with an opening down through which the coffee receptacle 29 is lowered. The catches 33 may be provided with slots 35 at their inner ends received loosely about pins 36 on a rotary disc 37 coupled for movement to the external knob 38. By rotating the knob 38, the disc 37 and pins 36 will also be made to rotate, causing a pivotal swinging of the catches 33 and the movement of the outer ends thereof beneath or away from the ring 32 of the coffee receptacle. It will of course be understood that the cover 35 may be held in place by other appropriate fastening means.

Water is supplied to the internal water space 11 through a service or other pipe 39 under the control of a valve 40. A vent or exhaust 41 is provided for the vapor space of the urn.

Figure 2:
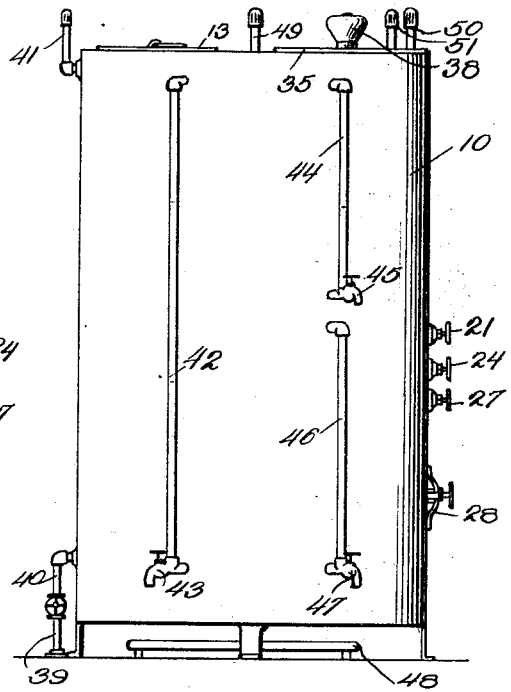
Figure 2 is a side elevation of the same.
Figure 3:
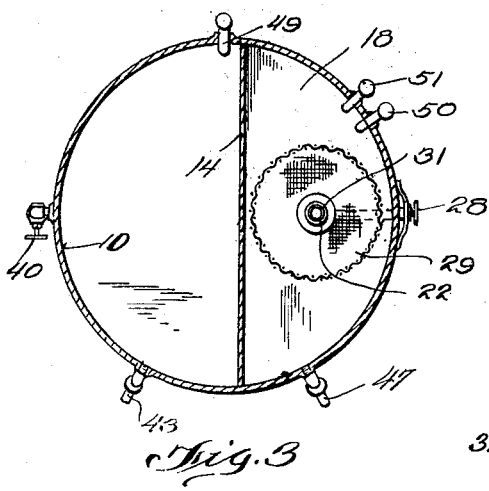
Figure 3 is a cross section taken on the line 3—3 in Figure 1.
Figure 4:
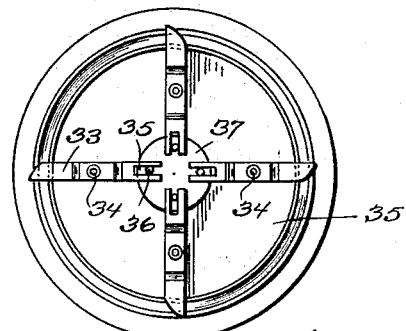
Figure 4 is a bottom plan view of the coffee receptacle cover taken on an enlarged scale.

As shown more particularly in Figure 2, a water gauge or glass tube is indicated at 42 having a faucet 43 at its lower end for drawing off hot water as desired. Furthermore, a glass gauge 44 is provided externally of the urn for the coffee-making compartment 18 in which the coffee liquor will rise, showing to the maker by its color the progress of the cooking operation.

At the lower end of this glass gauge 44 there may or may not be provided a faucet 45 for drawing off samples of the liquor. A third glass gauge 46 is provided externally upon the urn for the coffee-storage compartment 19, this gauge also preferably having a faucet 47 for the purpose of drawing off the final product for consumption.

In Figures 1 and 2, the urn is shown as disposed over a gas burner 48.

In the use of the device, the gas or other burner 48 will raise the water in the water space 11 to the boiling point. Water may be let in from time to time by opening the valve 40. Ground coffee in suitable amount is placed in the mesh receptacle 29 and such receptacle fitted into the urn as indicated in Figure 1. The valve 24 will be opened, the valves 21 and 27 remaining closed. Upon boiling the water will ascend through the tube 22 and will strike upon the imperforate cover 35 of the coffee receptacle, being deflected backwardly as indicated by the arrows and through the mass of coffee grains, thereby causing extraction of the content thereof which is taken up by the water and forms the coffee liquor.

This liquor flows through the glass gauge 44 and is under the observation of the coffee maker who understands by its color the condition of the liquor. Samples may also be drawn off through the connection 45 if found necessary.

When the coffee is brought to suitable condition, as the maker through his experience understands, the valve 21 is opened and the finished product is allowed to flow down through the connection 20 into the storage compartment 19. It will be understood that this is accomplished in closed chambers without access to the atmosphere and that there will not be any evaporation permitted and the coffee allowed to lose its aroma and "spirit." In this closed compartment 19 the coffee may be kept indefinitely and in fact it will preserve its freshness and taste.

The compartment 19 will preferably be of a size to hold several batches of the coffee made in the coffee compartment 18 above but I wish it to be understood that I am not restricting myself to size and proportions of the various compartments.

While service is being had from the storage compartment 19, the progress of coffee-making in the chamber 18 above may be continued so that the manufacture of the coffee may substantially form a continuous operation and as various batches are completed the same are let into the storage compartment by opening the valve 21.

In case a quantity of coffee remains in the storage compartment 19, fresh coffee made in the compartment 18 above may, without any loss of freshness, be allowed to enter into the storage compartment 19 and mingle with the coffee already in the latter compartment due to the fact that the freshness of the remaining coffee in the compartment 19 is maintained and preserved.

A flue pipe 49 extends up through the water pipe 11 of the urn and serves to convey off the gases of combustion and it also provides for heating the water throughout a long area, thus conserving the heat and fuel and securing from the heated products the maximum heat units. Vents or exhausts 50 and 51 are also provided in the urn for the compartments 18 and 19 to allow the escape of any excess pressure and the breathing of the compartments from the atmosphere so as to avoid the formation of any vacuum therein.

Figures 6, 7:
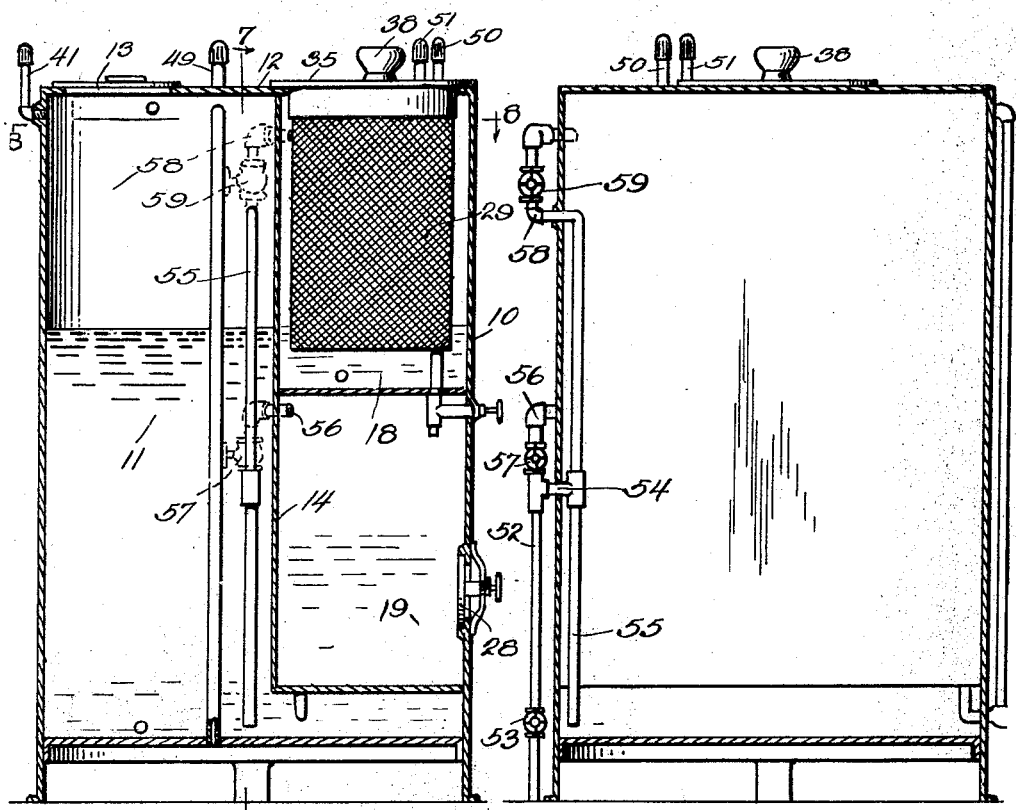
Figure 6 is a vertical section taken through a slightly modified form of coffee urn.
Figure 7 is also a vertical section taken on the line 7—7 in Figure 6.
Figure 8:
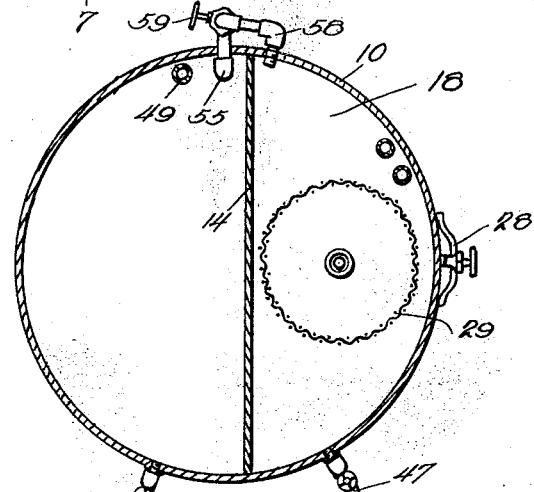
Figure 8 is a cross section taken on the line 8—8 in Figure 6.

Referring now more particularly to Figures 6, 7 and 8, a slight modification is shown herein. The general arrangement of the urn, the water space and the coffee making and storage compartments are substantially the same as in the form of the invention previously described and similar parts are given similar reference characters.

In the form of the invention illustrated in Figures 6, 7 and 8 however, a slightly different pipe and valve arrangement is provided, in which 52 designates the water service pipe having a valve 53 therein which controls the flow of water through a connection 54 to an interior standpipe 55 on the inside of the urn. The lower end of the standpipe is open in spaced relation to the bottom of the urn. A pipe connection 56 on the exterior of the urn extends from the upper end of the service pipe 52 to and through the wall of the urn and into the coffee-storage compartment 19. The flow of water through this connection 56 is governed by a valve 57. Cleansing water is supplied by this connection 56 to the coffee storage chamber.

The upper end of the interior standpipe 55 is coupled to an external connection 58 provided with a valve 59 and having connection with the interior space of the coffee-making compartment 18.

In the operation of this form of the invention, water is supplied to the water space of the urn by opening the valve 53. The boiling water is supplied to the coffee-making compartment 18 by opening the valve 59. When it is desired to clean the compartments, both valves 57 and 59 may be opened, thus supplying cleansing water and of course the compartment 18 is opened from above when the coffee receptacle is removed and the lower compartment is accessible through the door 28. It is obvious that various changes and modifications may be made in the details of construction and design of the above specifically described embodiment of this invention without departing from the spirit thereof, such changes and modifications being restricted only by the scope of the following claims.

What is claimed is:

1. An improved coffee urn comprising a container having a water space extending entirely across the bottom and at one side upwardly to the top thereof, a vertical partition in said container, spaced horizontal partitions extending from the vertical partition to the adjacent side wall of the container for providing separate enclosed coffee-making and coffee-storage compartments one above the other, a removable mesh receptacle for coffee grounds mounted in said coffee-making compartment, a tube extending from the water space below the coffee-storage compartment up into said receptacle, a valve for controlling flow through said tube, and an outlet from the coffee-making compartment to the coffee-storage compartment.

2. An improved coffee urn comprising a single container having a water space extending entirely across the bottom and at one side upwardly to the top thereof, a vertical partition in said container, spaced horizontal partitions extending from the vertical partition to the adjacent side wall of the container for providing enclosed coffee-making and coffee-storage compartments one above the other, a removable mesh receptacle for coffee grounds mounted in said coffee-making compartment, means for establishing communication between the water space and said receptacle, and an outlet from the coffee-making compartment to the coffee-storage compartment.

3. An improved coffee urn comprising a single container having therein a water space, a vertical partition in said container, and spaced horizontal partitions extending from the vertical partition to the adjacent side wall of the container to provide coffee-making and coffee-storage compartments, said coffee-making compartment being in communication with said water space.

4. An improved coffee urn comprising a single container having therein a water space, a vertical partition in said container, and spaced horizontal partitions extending from the vertical partition to the adjacent side wall of the container to provide coffee-making and coffee-storage compartments, said coffee-making compartment being in communication with said water space, and a flue extending up through the water space to convey off the gases of combustion and to heat the water throughout a long area.

In testimony whereof I affix my signature.

ANASTAS ONOFRIO.